(12) United States Patent
Rickett et al.

(10) Patent No.: US 6,663,773 B1
(45) Date of Patent: Dec. 16, 2003

(54) WASTE PROCESSING AND RECOVERY SYSTEM

(75) Inventors: John W. Rickett, Louisville, KY (US); Kevin L. Lyons, Louisville, KY (US)

(73) Assignee: Densified Solutions, L.L.C., Elizabethtown, KY (US)

( * ) Notice: Subject to any disclaimer, the term of this patent is extended or adjusted under 35 U.S.C. 154(b) by 0 days.

(21) Appl. No.: 10/222,621

(22) Filed: Aug. 16, 2002

(51) Int. Cl.[7] .................................................. C02F 9/00
(52) U.S. Cl. ....................................................... 210/258
(58) Field of Search .............................. 521/57; 585/241

(56) References Cited

U.S. PATENT DOCUMENTS

| | | |
|---|---|---|
| 5,223,543 A | 6/1993 | Iovino |
| 5,300,267 A | 4/1994 | Moore |
| 5,630,945 A | 5/1997 | Takayanagi et al. |
| 5,859,072 A | 1/1999 | Emori |
| 5,863,002 A | 1/1999 | Noguchi et al. |
| 5,891,403 A | 4/1999 | Badger et al. |
| 6,031,142 A | 2/2000 | Ponsford et al. |
| 6,098,649 A | 8/2000 | Noguchi et al. |
| 6,169,121 B1 | 1/2001 | Noguchi et al. |
| 2002/0062054 A1 | 5/2002 | Cistone et al. |

*Primary Examiner*—Morton Foelak
(74) *Attorney, Agent, or Firm*—James E. Cole; Middleton Reutlinger

(57) ABSTRACT

A waste disposal and recovery system for disposal of expanded polystyrene foam and recovery of a usable resin. The system includes a first tank and a second tank in flow communication. Within the second tank may be a plurality of settlement compartments with a filtration system. An organic solvent is used to dissolve the EPS foam which forms a waste solution. The waste solution is directed to the second tank where it is separated into resin and the organic solvent. The solvent may be recycled for use in dissolving more EPS foam while the resin may be removed for storage, shipment or sale.

11 Claims, 5 Drawing Sheets

WASTE PROCESSING AND RECOVERY SYSTEM

BACKGROUND OF THE INVENTION

1. Technical Field of the Invention

The present invention relates generally to a waste processing and recovery system. More particularly, the invention relates to a system for processing waste expanded polystyrene (EPS), reclaiming a resin used to form the polystyrene, and recycling a chemical used to process the EPS.

2. Description of the Related Art

Expanded polystyrene foam, also called EPS foam, is used in large quantities for packing manufactured product such as electronic equipment and home appliances. The foam polystyrene is easily formable in a plurality of desired shapes, yet is clean, easy to use, and relatively inexpensive.

However, foam polystyrene has several deficiencies. First, it does not decompose in landfills which is a significant problem since it is used in such large quantities and typically thrown away by consumers. Second, the EPS burns at very high incineration temperatures producing a very strong and offensive odor. And, these high temperatures may be very harmful to the incinerator. With these inadequate environmental results, alternative solutions have been sought for replacement of the expanded polystyrene.

Pulp based materials such as paper and cardboard have been tried due to the high recovery rate of these materials. Pulp-based materials owe their shock-absorption characteristics to their corrugated shape however, this shape does not absorb shock with results comparable to expanded polystyrene. Thus large consumer products such as washer and dryer sets, refrigerators and ovens must be packaged with EPS.

In view of the deficiencies in known methods for processing expanded polystyrene (EPS) and apparatuses for said process, an apparatus and method are needed for processing waste EPS foam with an organic solvent such that resin can be reclaimed or recaptured for producing recycled EPS foam and the organic solvent recycled for further recycling of EPS foam into resin.

SUMMARY OF THE INVENTION

It is an object of the present invention to provide an apparatus for dissolving expanded polystyrene foam into a polystyrene waste solution.

It is a further object of the present invention to provide an apparatus for separating the waste solution into a resin and an organic solvent.

It is yet a further object of the present invention to provide an apparatus for use with an organic solution which dissolves the EPS foam and recycles the organic solution.

It is another object of the present invention to have a system for recapturing the resin used to form EPS foam.

It is still another object of the present invention to provide system which can dissolve large quantities of EPS foam.

Specifically, the present invention provides a system for dissolving and separating expanded polystyrene having a first tank with at least one applicator, a second tank having at least one weir and at least one filtration system in flow communication, the first tank and the second tank being in flow communication. The first tank maybe a hopper for bulk feeding expanded polystyrene (EPS) foam and reducing the polystyrene and organic solution, to a polystyrene waste solution. The at least one applicator provides recycled organic solution to the first tank in order to dissolve the EPS foam. The first tank may have a sloped floor biasing fluid flow toward a fluid outlet near a lower portion of the first tank. Within the first tank, the EPS foam is dissolved resulting in a waste product comprising a resin and an organic solution. The first tank may also comprise an agitator, such as an auger or the like therein to increase the dissolution of the EPS foam. Alternatively, a person may manually agitate the contents of the first tank by stirring the EPS foam and organic solution thereby increasing the contact therebetween and amount of agitation.

In flow communication with the fluid outlet is a strainer which inhibits garbage and the like from flowing from the first tank to the second tank. A flow communication path is provided between the first and second tank and the flow communication may be induced by gravity feed or, as shown in the instant embodiment, may be pumped. The flow communication path of the instant embodiment is a metal pipe and provides flow between the first tank, a first pump, and the second tank. The first pump provides a suction or negative pressure on a first tank side of the pump and a positive pressure on a second tank side of the pump such that the pump induces flow from the first tank to the second tank.

Within the second tank are a plurality of compartments in flow communication. However, in an alternative embodiment a plurality of tanks in flow communication may be used, each having one or more compartments. The second tank acts as a settlement tank or separator tank. In the instant embodiment, three settlement compartments are defined by the second tank, a filtration system, and a weir. The second settlement tank has a first compartment defined by the tank walls and a sealed filtration system where the waste solution, comprising resin and organic solvent, is pumped. The resin has a higher density than the organic solvent. The difference in specific gravities insures that the non-soluble organic solvent forms a layer above the heavier resin.

The filtration system within the second tank is defined by a plurality of porous shells. As exemplified in the instant invention, the shells may be a plurality of PVC pipes, each having a plurality of holes therein, mounted within at least one filter bank. The at least one filter bank is defined by a metal frame which is mounted within the second tank and is sealed to prevent flow of the waste solution around the filter system. Each of the PVC pipes has an open top so that a wick material, preferably polypropylene rope, may be packed therein. The polypropylene rope acts as a wick to pull the organic solvent through the plurality of holes and across the filter system and into a second settlement compartment.

The second settlement compartment is defined by the second tank, the filter system and seal, and a weir. As the organic solvent and some reduced quantity of resin wick through the filter system, they are deposited in the second settlement compartment. As in the first settlement compartment, the second compartment allows the resin and organic solvent to separate due to their different specific gravities and non-solubility. The weir extends upwardly from the tank a pre-selected distance such that the organic solvent layer formed above the resin flows there over into a third settlement compartment.

The third settlement compartment is defined by the tank and the weir and has substantially clean organic compound therein. A second pump is disposed above the third settlement compartment with a suction line extending therein. The suction line provides a flow communication path between the third settlement compartment and the second pump. On the positive pressure side of the pump, a flow communication path or pipe extends to the first tank and the applicator disposed therein. The applicator receives the recaptured organic solvent and sprays the solvent through a plurality of nozzles over the expanded polystyrene foam being placed in the first tank. Thus the process begins again.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

Figure 1:
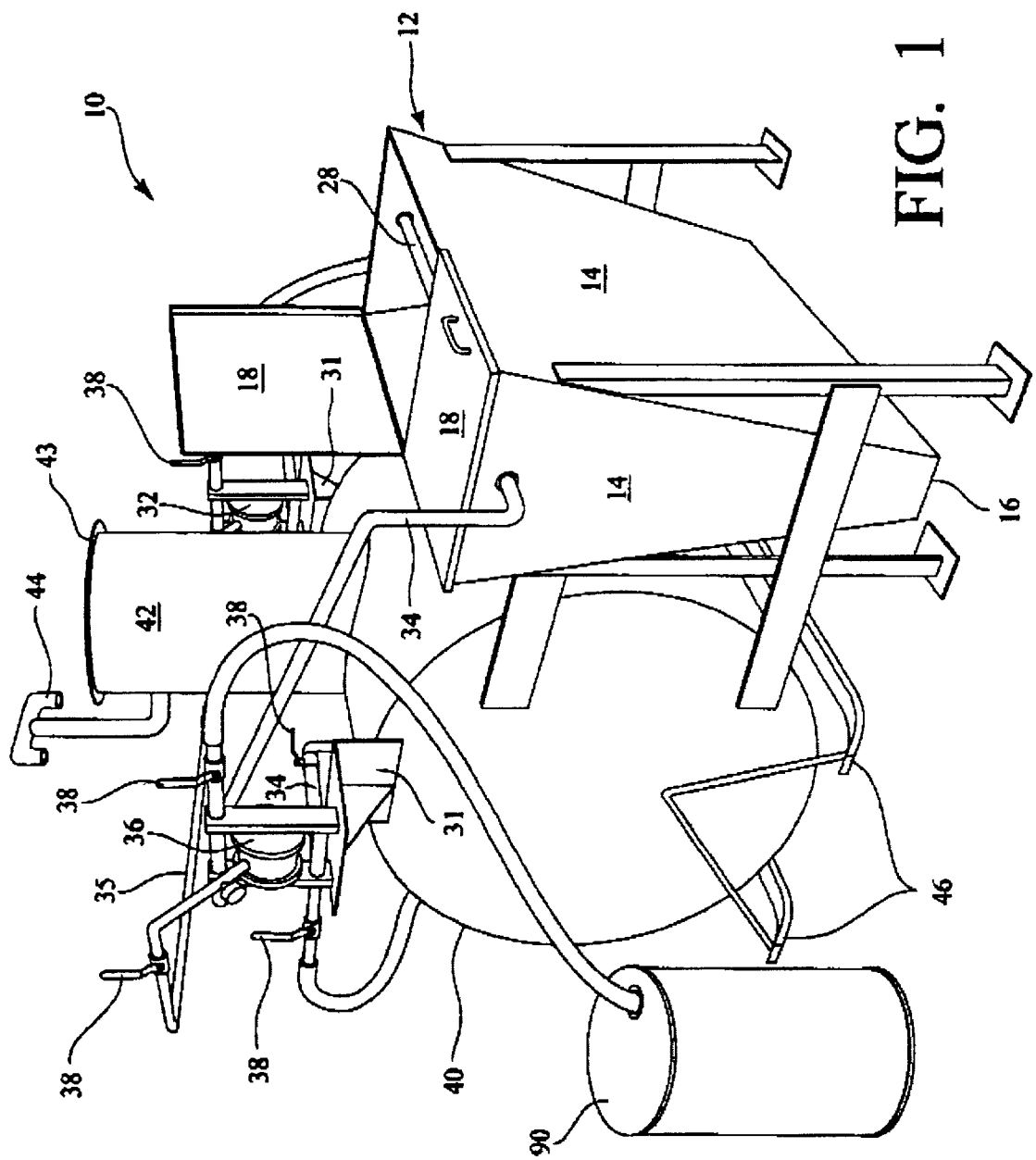
FIG. 1 shows a perspective view of a waste processing and recovery system.

The present invention will now be described in conjunction with the drawings, referring initially to FIGS. 1, 2, and 3 a waste processing and recovery system 10 is shown. The design of the instant invention provides an apparatus for dissolving expanded polystyrene (EPS) foam in an organic solvent and recovering a resin which may be used to form recycled EPS foam as well as the organic solvent used to dissolve the EPS foam.

The organic solvent used with the present invention may be D-limonene, an oily solvent that is produced from citrus peels, particularly orange peels. The solvent may be produced by crushing and steam-distilling citrus peels. However, selection of this particular solvent should not be deemed to limit the teachings of the present application. A number of other solvents, both organic and inorganic, may be utilized. The selection herein of the solvent used is exemplary only and is not deemed to limiting.

The waste processing and recovery system 10 includes a first tank 12 or hopper which acts as a bulk feeder or reduction tank wherein the EPS foam is received and dissolved. The first tank 12 is exemplified as a hopper in the instant embodiment however this is merely illustrative. The first tank 12 may be mounted on legs and/or attached to a second tank 40 used in the instant system 10. The waste processing and recovery system 10 may also be mounted on a sled 46 for ease of transportation between processing sites. The first tank 12 may be an enclosure having at least one continuous sidewall 14, and preferably four walls 14 with a bottom 16 forming an enclosure. An upper opening of the first tank 12 should be coverable to inhibit evaporation of the organic solvent and hardening of the resin therein. The instant embodiment includes at least one hinged cover or lid 18 which may be disposed in an open position during loading or feeding of the EPS foam and closed when the system is not in use. However, the cover may be slidable or otherwise moveable so that EPS foam may be placed therein in bulk. The bottom 16 of the first tank 12 may be sloped or the tank 12 may have a sloped floor 20 therein. The slope or grade within the first tank 12 should be biased toward a fluid outlet 22 disposed in a lower portion of a sidewall 14. As the organic solvent and the EPS foam become a waste solution, the sloped floor 20 and gravity cause the waste solution to flow toward the fluid outlet 22.

Within the first tank 12 may be an agitator 26. As shown in FIG. 3 the agitator may be in the form of an auger having a plurality of flights which continuously rotate by a motor drive and thereby continuously mix the EPS foam and organic compound and agitate the waste solution. In an alternative embodiment the agitator 26 may be a simple implement manually rotated to stir the EPS foam in the organic solvent. However, these embodiments are merely illustrative and any known system for agitation may be used or no agitator may be needed for use with the present invention.

At a lower end of the sloped floor 20 and in flow communication with the fluid outlet 22 may be a strainer 24. The strainer 24 prevents any incidental garbage which may be shipped with the EPS foam and dumped into the first tank 12 from entering the flow communication path 30. The strainer 24 may have a plurality of pre-selected hole sizes however these sizes should not be so small as to hinder the flow of the waste solution into the fluid communication path 30 as this may damage a first pump 32 in fluid communication therewith.

Figure 2:
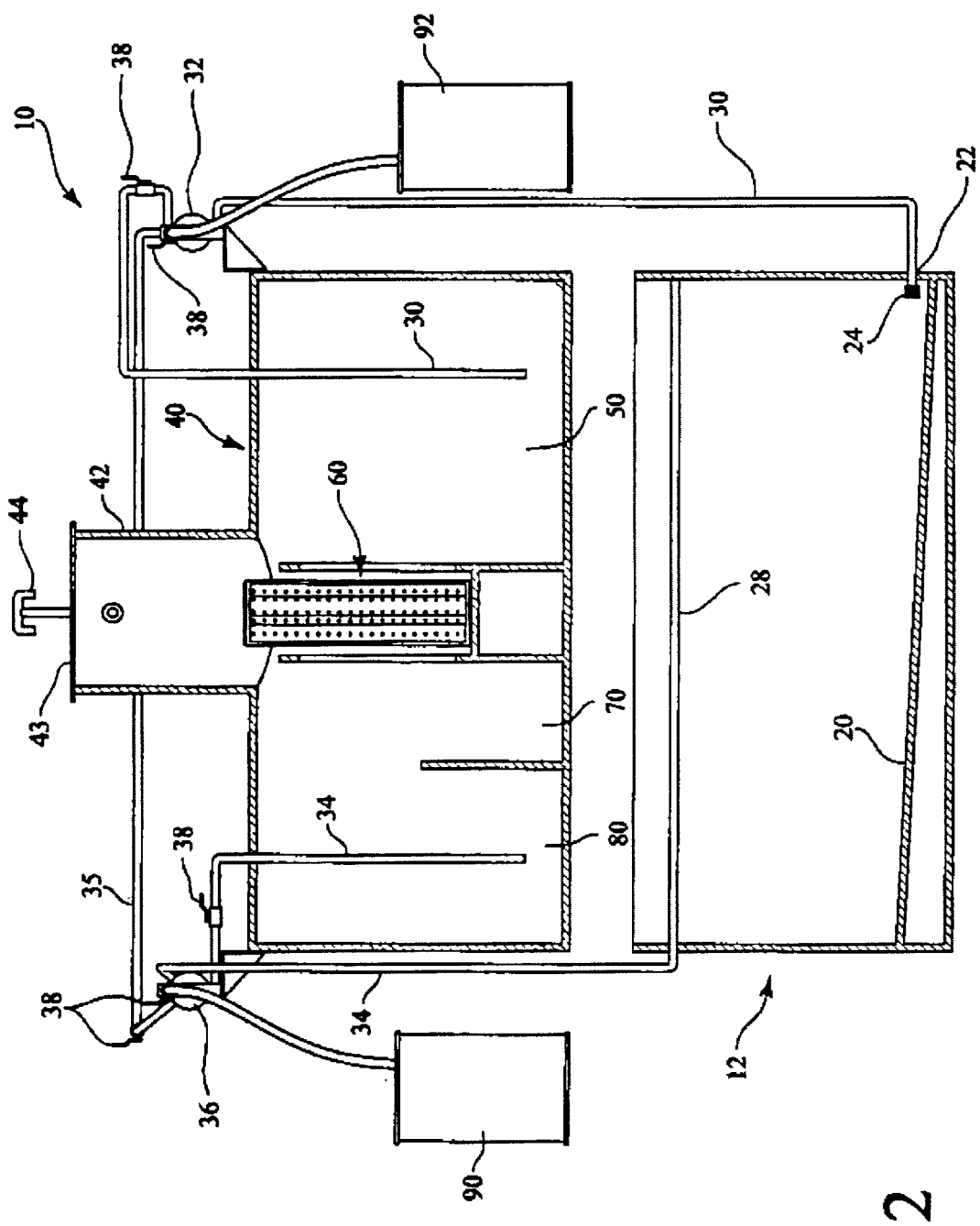
FIG. 2 shows a side view with a cut-away portion of a second tank of the waste processing and recovery system of FIG. 1.
Figure 3:
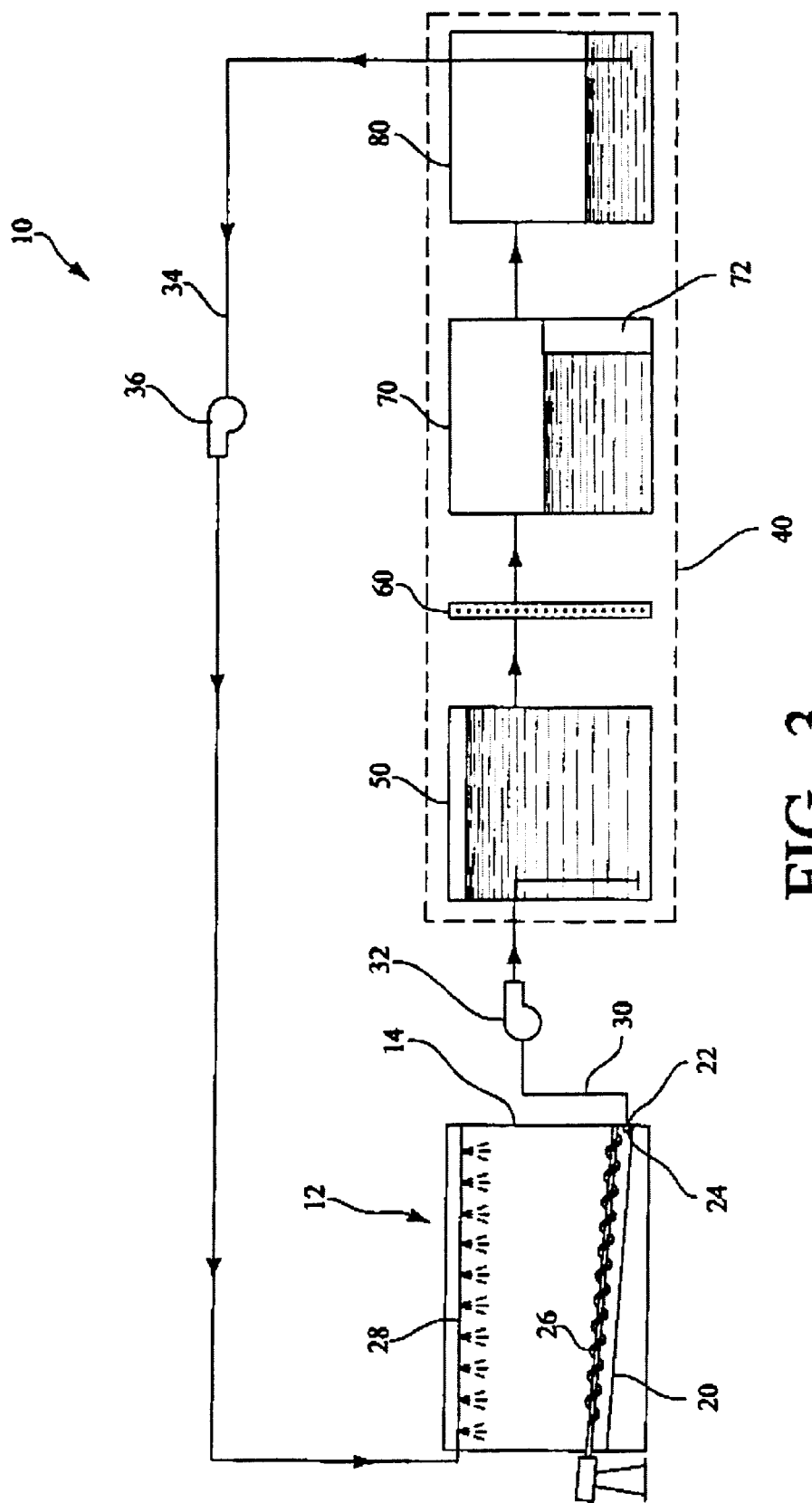
FIG. 3; shows a schematic drawing of the waste processing and recovery system of FIG. 1.

As best depicted in FIGS. 2 and 3, a first pump 32 is in fluid communication with the first tank 12 and the second tank 40. On a negative pressure side or suction side of the pump 32 waste solution is removed from the first tank 12 via the fluid outlet 22. The waste solution moves through the pump 32 and to the second tank 40. However, this is merely illustrative and, in an alternative embodiment, the first tank 12 may be positioned at a higher elevation than the second tank 40 such that the waste solution flows by gravity to the second tank 40.

The second tank 40, shown in FIGS. 1,2, and 3, has a substantially cylindrical design however any enclosure shape may be used to form the second tank 40. The second tank 40 may be made of various materials including steel and may be covered with a corrosion resistant coating both inside and out to resist attack by the organic solvent. The second tank 40 may be mounted on a sled 46 and connected to the first tank 12 such that the entire waste processing and recovery system 10 is easily transportable. The first pump 32 may be mounted in a plurality of positions including, as shown in FIG. 1, on a flange 31 extending from the second tank 40. The first pump 32 has a flow rate of about 12 gallons per minute however this is exemplary and may vary depending on the amount of foam being dissolved and the size of the first and second tanks. The first pump 32 as shown in FIG. 1, is in flow communication with an air line 35 as the pump 32 is compressed air driven. Use of compressed air is desirable since many manufacturing facilities have connections to a compressed air system readily available. However, this design is illustrative and electric, hydraulic, or other type motors may be substituted if desired. The first pump 32 may also be caustic rated to inhibit corrosion of the pump lining and impellers caused by the organic solvent.

Within the second tank 40 are a plurality of compartments and, as shown in FIG. 2, preferably three compartments. The first, second and third compartments 50, 70, 80 are in gravity-feed flow communication. In an alternative embodiment the compartments 50, 70, 80 may be disposed in two or more separate tanks, the tanks being in flow communication.

As shown in FIG. 3, the first pump 32 is in flow communication with the first compartment 50 such that the waste solution is disposed therein. The first compartment 50 is defined by the tank wall 41, shown in FIG. 1, a filter system 60, shown in FIGS. 2 and 3, and a seal 69 beneath the filter system 60. The flow communication path 30 directs waste solution from the first tank 12 to the first compartment 50. The level of waste solution rises in the first compartment 50 until it reaches a pre-selected level allowing gravity feed flow communication with the filter system 60.

Figure 4:
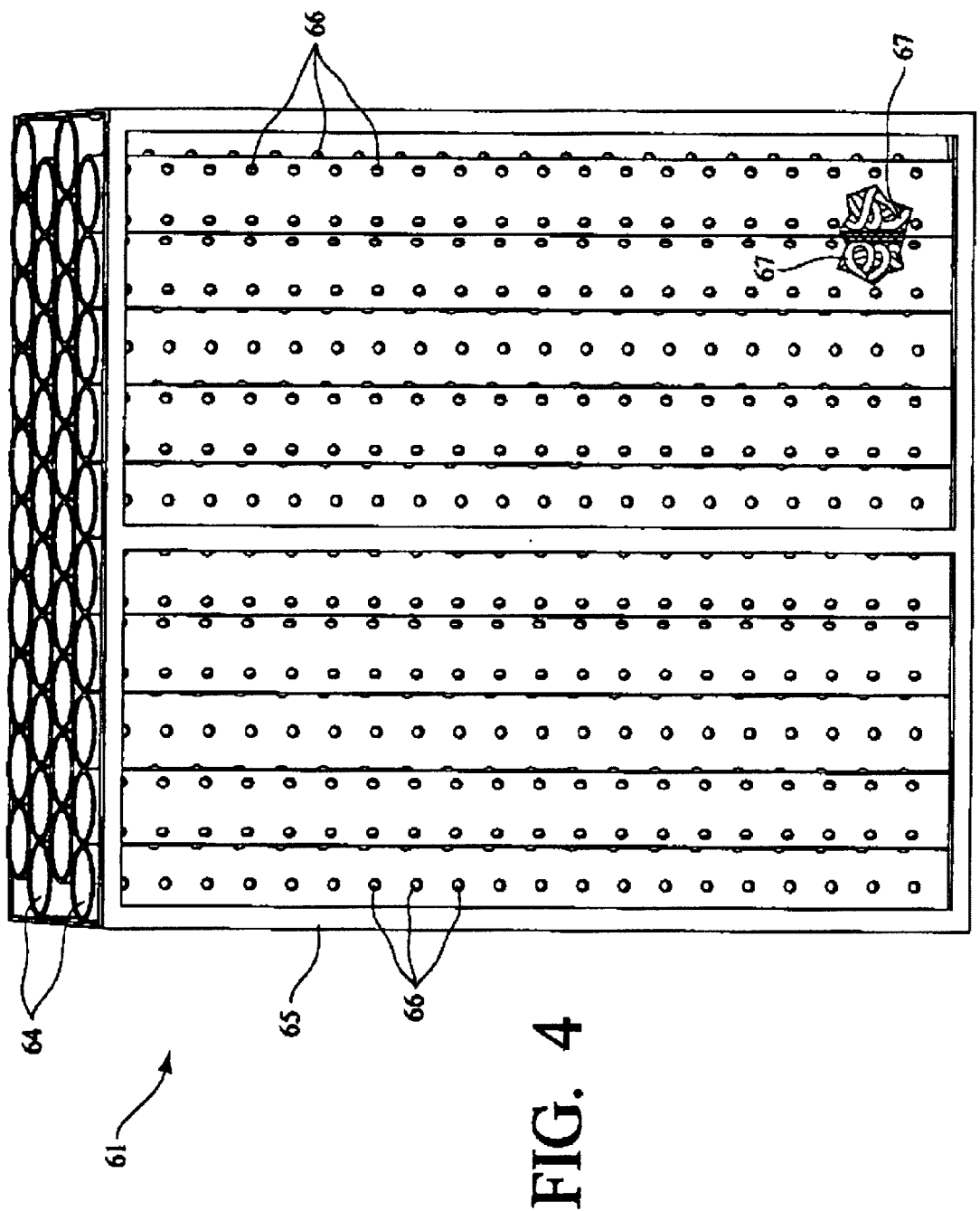
FIG. 4 shows perspective view of a filtration bank used with the waste processing and recovery system of FIG. 1; and, FIG. 5 shows a top view of the second tank with a cut-away view of filtration system of FIG. 3.
Figure 5:
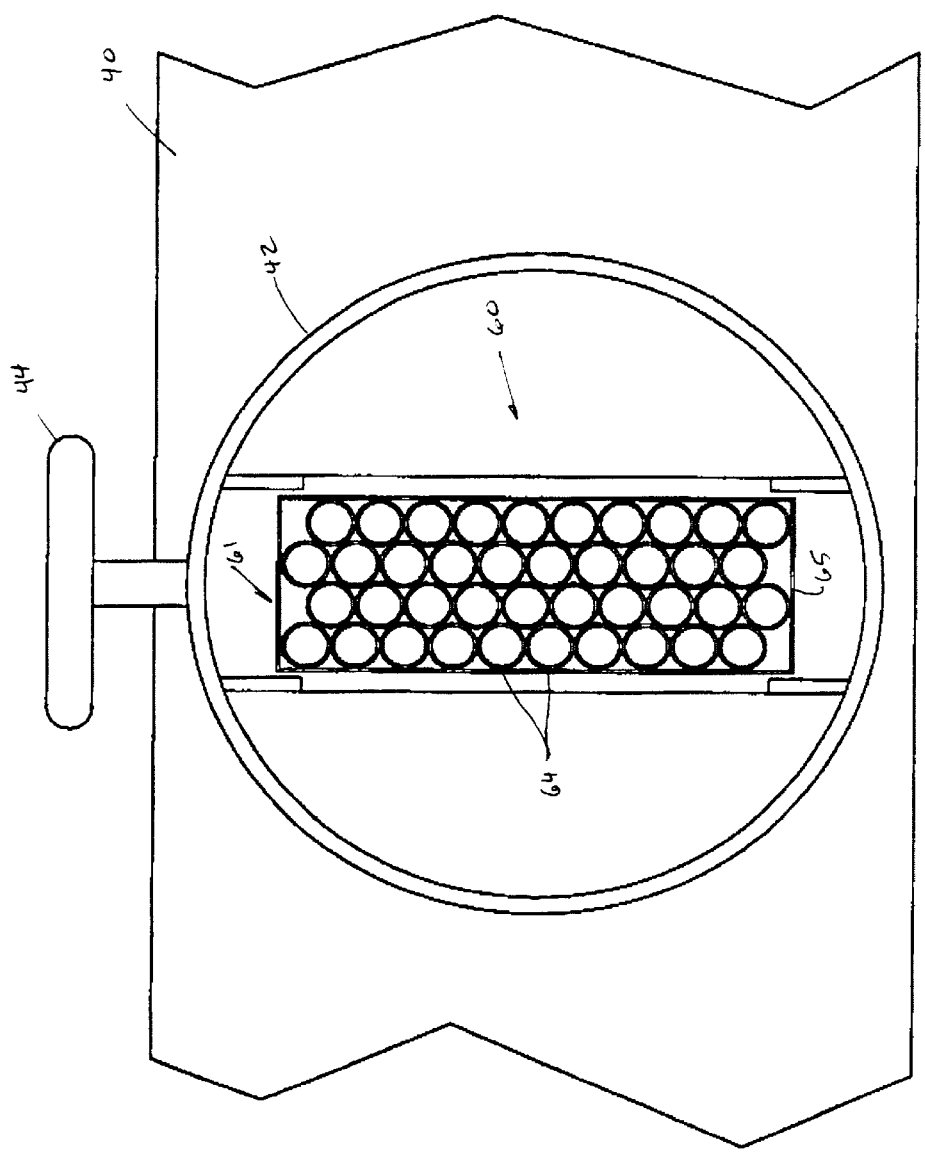

The filter system 60 of the instant embodiment has at least one filter bank or cartridge 61 as shown in FIG. 4 and 5. However, the filter system 60 of the instant embodiment is merely illustrative and various other design may be substituted having the same function of the filter system 60. The filter system 60 of the instant invention functions to substantially retain the high density resin of the waste solution in the first separator compartment 50 while allowing the lower density organic solution to pass therethrough to the second settlement or separator compartment 70. The cartridge or bank 61 includes a substantially box frame 65 within the second tank 40 disposed between the first settlement compartment 50 and second settlement compartment 70. Within the box frame 65 is at least one filter cartridge 61 having a plurality of porous shells 64. The porous shells 64 of the instant invention may be PVC pipes having a plurality of flow through apertures 66 disposed therein, for instance disposed on a plurality of horizontal planes and spaced apart about 90 degrees. The flow through apertures 66 of the present invention are preferably sized to allow low density materials such as the organic solvent to move therethrough but inhibit the high density resin from moving therethrough. The flow-through apertures 66 of the instant invention may be between about 1/16" and 9/16".

The porous shells 64 are hollow having an open top such that a wick 67 can be packed therein. The wick 67 may be formed from a plurality of materials for instance, as exemplified in the instant embodiment, a polypropylene rope. The wick 67 pulls the light density organic solvent across the filtration system 60 while inhibiting passage of the resin therethrough.

The filter system 60 may be comprised of a plurality of tightly spaced porous shells 64 within a frame 62 forming a cartridge or bank 61. The porous shells 64 are preferably spaced in offset rows such that a gap formed by two adjacent porous shells 64 of a first row is substantially filled by a porous shell 64 of an adjacent row. This offset pattern inhibits leakage between the rows of porous shells 64. In one embodiment of the present filtration system 60, there are four rows of shells 64 within the box shaped frame 62 forming the cartridge 61. However, this may vary depending on the volume of flow and amount of waste solution derived during the process. The filtration system housing is box shaped as stated above and is sealed about its edges so that waste solution cannot pass between the housing and second tank walls 41 to the second compartment 70. The filtration system 60 of the instant invention has one cartridge having about forty porous shells 64 but may include a plurality of cartridges 61 having at least one porous shell 64 therein.

As the organic solvent passes from the filtration system 60 to a second compartment 70, defined by the tank walls 41, the filtration system 60, and a weir 72. Within the second compartment 70 is a majority of organic solvent and a slight amount of resin which gets pulled across the filtration system 60. Thus the weir 72 is positioned as a hydraulic obstacle between the second compartment 70 and the third compartment 80. In the present invention, the weir 72 has a pre-selected height and slows the gravity flow between the second and third compartments 70,80. By the slowing the flow of waste solution therethrough heavy resin which passes through the filter system 60 settles to the bottom of the second compartment 70 while the lighter organic solvent forms a layer above the resin. As the level of liquid rises in the second compartment 70, the organic solvent reaches a level at which it may pass over the weir 72 into the third compartment 80 as will be understood by one of ordinary skill in the art.

Within the third compartment 80 is a substantially recycled or recaptured organic solvent. The third compartment is defined by the weir 72 and the second tank walls 41. A flow communication path 34 extends from a second pump 36 to within the third compartment 80 providing a negative pressure or suction therein. The pump 36 removes the recycled organic solvent from the third compartment 80 and directs the recycled organic solvent to the first tank 12 and an applicator 28. The pump 36 may be mounted in a plurality of positions and, as shown in FIG. 1, the second pump 36 is mounted to a flange extending from the second tank 40. The second pump 36 is similar to the first pump 32 described above. The second pump 36 has a caustic rating to protect the impellers and pump lining from corrosion induced by the organic solvent. As shown in FIG. 1 the air line 35 is disposed between the first and second pumps 32,36. Compressed air may be used to power the motors since its is readily available at manufacturing facilities or portable compressed air tanks may be used as an air source. However, this is merely illustrative as electric motors may also be used if desired.

As shown in FIG. 3, the applicator 28 of the present invention may be a spray bar having at least one nozzle 29 therein. The applicator 28 receives the pressurized flow from the second pump 36 and sprays the organic solvent over the EPS foam being placed into the first tank 12.

As shown in FIGS. 1 and 2, a plurality of valves 38 are disposed around the pumps 32,36. The valves 38 are plumbed to allow at least one alternate operation of the pumps 32,36. For instance, from time to time the amount of organic solvent which is recaptured may vary and therefore some organic solvent may be pumped into the third compartment 80 to replenish the supply. This may be performed by adjusting a plurality of valves 38 adjacent the second pump 36 so that suction can be directed to a drum 90 containing fresh organic solvent and the flow may be directed toward the third compartment 80. Alternatively, the first compartment may become filled with resin. The valves 38 may be adjusted to divert the suction of the first pump 32 to a hose disposed within the first compartment. The resin may then be pumped into a drum 92 or the like for storage, shipping, or sale. One of ordinary skill in the art will understand a plumbing and valve design necessary to accomplish the above described action.

As shown in FIG. 1, extending upward from the second tank 40 is a centrally disposed access hatch 42. The hatch 42 has a top 43 which is detachably connected so that upon removal of the top 43, one may access the inner portion of the second tank 40. Preferably, as shown in the instant embodiment, the hatch 42 provides access to the filtration system 60, wherein the filter cartridges 61 may be removed for cleaning or other service. Also extending from the hatch 42 may be a vent pipe 44. The vent pipe 44 allows for fluid flow in the gravity feed flow communication described throughout the second tank 40. Without a vent the system may become vapor locked precluding flow through the first, second, and third compartments 50, 70, and 80.

In use a compressed air source is connected to the air line 35, which in turn is in flow communication with the first and second pumps 32, 36. A pre-selected amount of organic solvent is pumped or poured into the third compartment 80 of the second tank 40. As the pumps 32, 36 start, the organic solvent is pumped through the applicator 28 and nozzles 29 and into the first tank 12. The at least one hinged lid 18 is opened and EPS foam is loaded into the first tank 12, preferably bulk fed by conveyor, "Bobcat" loader, or some other type of material handling equipment, including manually handling the EPS foam. The system 10 may have an agitator 26 which speeds the process of dissolving the EPS foam. As the EPS foam dissolves into resin, the resin and solvent become a waste solution and flow toward the fluid outlet 22 of the first tank. The waste solution is then pumped by the first pump 32 or gravity fed to the second tank 40, and more specifically the first compartment 50. In the first compartment 50 the waste solution settles out such that the heavier and more dense resin separates toward the bottom of the compartment while the lighter organic solvent forms a layer above the above the resin. As the level raises in the compartment, the resin reaches a position where it passes into the filtration system 60. The porous shells 64 and wick material 67 pulls the solvent across the system 60 while substantially inhibiting the passage of resin therethrough. Upon exiting the filtration system 60 the organic solvent moves into the second compartment 70. The solvent and any remaining resin again separate with the resin moving toward the bottom of the compartment 70 and the solvent forming a layer above the resin. As the level of solution in the compartment 70 raises, the solvent passes over the weir 72 and gravity flows to the third compartment 80. Once the solvent reaches the third compartment 80, it may be pumped via a second pump 36 to the applicator 28 and first tank 12 to restart the process. After the process is completed, the valves 38 of the instant invention may be adjusted to direct the pumps 32, 36 to remove resin from the compartments first and second compartments 50, 70 as well as pumping fresh organic solvent into the third compartment 80.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A process for dissolving expanded polystyrene foam and recovering an organic solvent and a resin, comprising:
   a. directing an organic solvent into a first tank;
   b. disposing an expanded polystyrene foam in said first tank;
   c. dissolving said expanded polystyrene foam into a polystyrene waste solution in said first tank;
   d. straining and directing said waste solution to a fluid outlet in said first tank;
   e. flowing said waste solution to a second tank having a first compartment, a second compartment, and a third compartment, said waste solution being deposited in said first compartment;
   f. separating said waste solution into a resin and an organic solvent by settling in said first compartment;
   g. extracting said organic solvent through a filtration system;
   h. directing said extracted organic solvent to a second compartment and separating therein;
   i. directing said extracted solvent over a weir to a third compartment;
   j. recirculating said extracted organic solvent from said third compartment to said first tank; and,
   k. pumping said resin from said second tank.

2. The process of claim 1 including the step of spraying said organic solvent on said expanded polystyrene through a plurality of nozzles.

3. The process of claim 1 further comprising the step of agitating said expanded polystyrene foam and organic solvent in said first tank.

4. The process of claim 1 including the step of pumping said waste solution from said first tank to said second tank.

5. The process of claim 1 including the step of directing said waste solution from said first compartment to said second compartment by gravity flow.

6. The process of claim 1 including the step of directing said organic solvent through at least one porous shell having at least one wick therein.

7. The process of claim 1, said at least one porous shell being at least one PVC pipe.

8. The process of claim 1, said wick being a polypropylene rope.

9. The process of claim 1 including the step of directing said organic solvent from said second compartment to said third compartment by gravity flow.

10. The process of claim 1 including the step of directing of an organic solvent into a first tank with a compressed air pump.

11. A process for disolving expanded polystyrene foam and recovering an organic solvent and a resin, comprising:
   a. disposing an expanded polystyrene foam in said first tank;
   b. pumping an organic solvent into a first tank through at least one nozzle;
   c. dissolving said expanded polystyrene foam into a polystyrene waste solution in said first tank;
   d. straining and pumping said waste solution through a fluid outlet in said first tank to said second tank;
   e. said second tank having a first compartment, a second compartment, and a third compartment, said waste solution being deposited in said first compartment;
   f. separating said waste solution into a resin and an organic solvent by gravity in said first compartment;
   g. flowing said organic solvent through a filtration system;
   h. directing said extracted organic solvent to a second compartment and separating therein;
   i. directing said extracted solvent over a weir to a third compartment;
   j. pumping said extracted organic solvent from the third compartment to said first tank; and
   k. pumping said resin from said second tank when said process is complete.

* * * * *